[12] United States Patent
Chrysos et al.

(10) Patent No.: US 7,624,236 B2
(45) Date of Patent: Nov. 24, 2009

(54) PREDICTIVE EARLY WRITE-BACK OF OWNED CACHE BLOCKS IN A SHARED MEMORY COMPUTER SYSTEM

(75) Inventors: George Z. Chrysos, Milford, MA (US); Matthew Mattina, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 11/023,882

(22) Filed: Dec. 27, 2004

(65) Prior Publication Data
US 2006/0143406 A1 Jun. 29, 2006

(51) Int. Cl.
G06F 12/00 (2006.01)
G06F 13/00 (2006.01)
G06F 13/28 (2006.01)

(52) U.S. Cl. .................. 711/147; 711/141; 711/142; 711/143

(58) Field of Classification Search ................. None
See application file for complete search history.

(56) References Cited

U.S. PATENT DOCUMENTS

| | | | | |
|---|---|---|---|---|
| 4,521,874 A | * | 6/1985 | Rau et al. ............... 365/221 |
| 4,860,192 A | * | 8/1989 | Sachs et al. ................ 711/3 |
| 5,297,269 A | * | 3/1994 | Donaldson et al. ........ 711/145 |
| 5,625,836 A | * | 4/1997 | Barker et al. .............. 709/214 |
| 5,748,938 A | * | 5/1998 | Kahle ...................... 711/138 |
| 5,926,829 A | * | 7/1999 | Hagersten et al. .......... 711/120 |
| 6,055,605 A | * | 4/2000 | Sharma et al. ............. 711/130 |
| 6,151,658 A | * | 11/2000 | Magro ..................... 711/110 |
| 6,668,308 B2 | * | 12/2003 | Barroso et al. ............ 711/141 |
| 6,865,646 B2 | * | 3/2005 | David ...................... 711/128 |
| 2002/0124144 A1 | * | 9/2002 | Gharachorloo et al. ..... 711/145 |
| 2003/0131201 A1 | * | 7/2003 | Khare et al. .............. 711/144 |
| 2003/0196047 A1 | * | 10/2003 | Kessler et al. ............. 711/147 |
| 2003/0229676 A1 | * | 12/2003 | Rowlands ................. 709/216 |
| 2003/0233523 A1 | * | 12/2003 | Jamil et al. ............... 711/144 |

OTHER PUBLICATIONS

European Patent Office, International Search Report and Written Opinion for International Application No. PCT/US2005/047589, 11 pages, May 8, 2006.

* cited by examiner

Primary Examiner—Matt Kim
Assistant Examiner—Ralph A Verderamo, III
(74) Attorney, Agent, or Firm—David P. McAbee

(57) ABSTRACT

A method for predicting early write back of owned cache blocks in a shared memory computer system. This invention enables the system to predict which written blocks may be more likely to be requested by another CPU and the owning CPU will write those blocks back to memory as soon as possible after updating the data in the block. If another processor is requesting the data, this can reduce the latency to get that data, reducing synchronization overhead, and increasing the throughput of parallel programs.

22 Claims, 4 Drawing Sheets

PREDICTIVE EARLY WRITE-BACK OF OWNED CACHE BLOCKS IN A SHARED MEMORY COMPUTER SYSTEM

BACKGROUND INFORMATION

Multi-processor data processing systems harness the collective computation power of multitude of processors. A memory system is central to a multi-processor system and must be scaleable in order to provide sufficient bandwidth to each processor while sharing data between the multiple processors. For certain applications, an efficient means of sharing data is critical to effective collaboration between the threads running on the multiple processors.

Most data blocks that are written by a CPU tend not to be read or written by other agents/processors shortly after ownership has been obtained. However, some blocks may be very heavily shared in short periods of time, if the blocks are being used to synchronize multiple threads of execution. Communication or synchronization latency overheads can be one factor in determining the scalability of a multi-threaded workload on a multi-processor system, like a chip multi-processor.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

This invention relates to write-backs of owned cache blocks for a scalable shared memory system composed of chip multiprocessor nodes. Embodiments of the present invention may provide a semiconductor chip including processors, and a bidirectional ring interconnects to couple together the processors and the shared address space. In accordance with one embodiment of the present invention, each processor may include multiple CPUs and the address space may include a large shared cache. Each CPU may have its own private instruction and data caches (first level caches) and all CPUs sharing a single second level cache. Cache coherence is maintained among all the caches within a chip, as well among all caches across the nodes by a protocol engine and a cache controller that may be included in each node of the system.

All specific quantities (such as number of processors, number of nodes, number of interfaces) disclosed in this document, are provided solely for purposes of explaining the operation of one particular embodiment. These quantities will typically vary, sometimes significantly, from one implementation of the invention to another.

Figure 1:
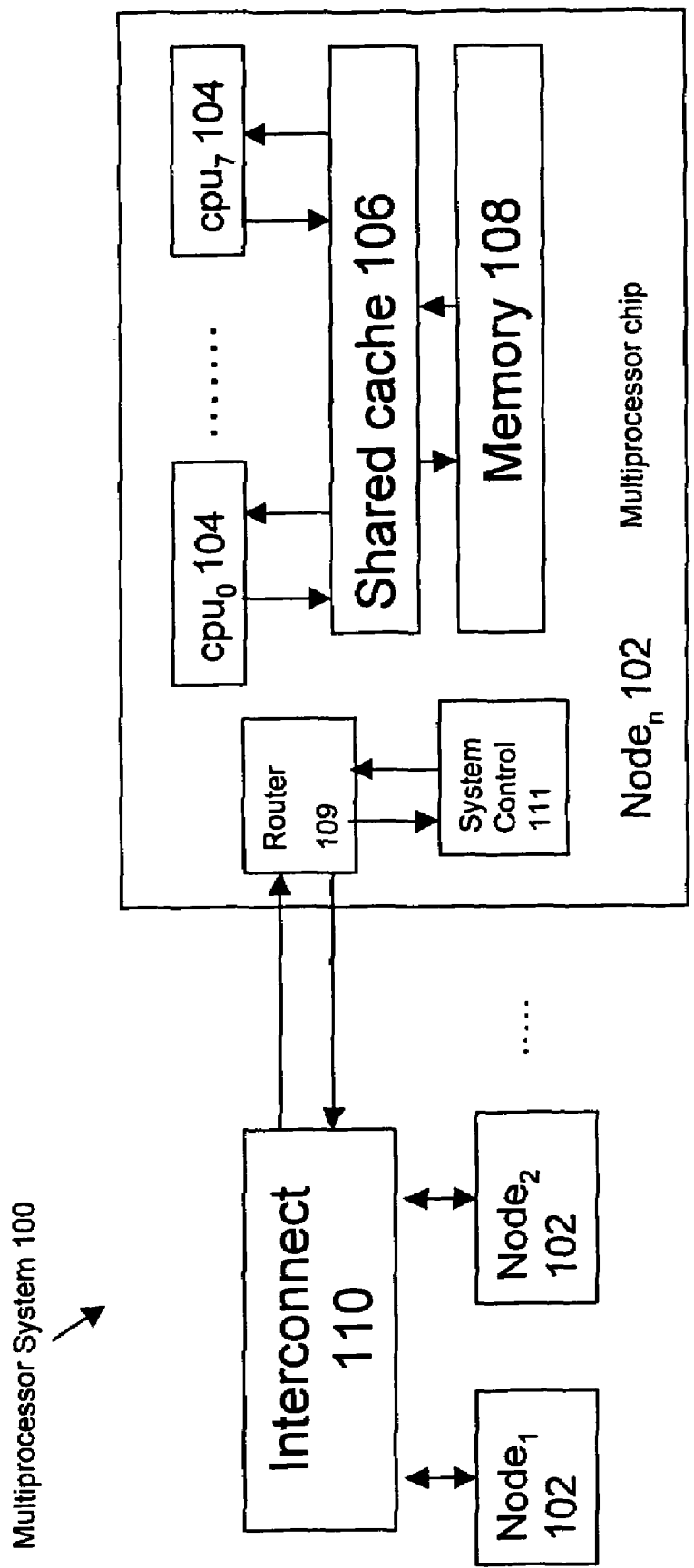
FIG. 1 is a block diagram of a multiprocessor system.

Referring to FIG. 1, there is shown a multiprocessor system 100 including a multiplicity of processor nodes 102. Each processor node 102 is preferably implemented as a single chip multiprocessor. In a preferred embodiment, each processor node 102 may have eight processor cores 104; however, other embodiments may have two to sixteen processor cores 104. The processor cores 104, which may be comprised of a central processing unit, are processor cores since their caches and other supporting circuitry are shown separately (see FIG. 2).

Each core 104 is connected to a logically shared backing cache 106. Coupled to the shared backing cache 106 is memory 108. The memory 108 may represent any type of memory device used to store data and instructions that may have been or will be used by the processors.

Typically, though the invention is not limited in this respect, the memory 108 may consist of dynamic random access memory (DRAM). In another embodiment the memory 108 may include a semiconductor memory. In yet another embodiment, memory 108 may include a magnetic storage device such as a disk drive. The present invention, however, is not limited to the examples of memory mentioned here.

Multiple nodes 102 may be linked by a subsystem including a router 109 and an interconnect 110. The subsystem may also include an input queue, an output queue, a packet switch (all not shown). The router 109 may send and receive packets to and from other nodes via the interconnect 110. The interconnect 110 may physically link the multiple nodes 102. A system control module 111 takes care of the miscellaneous maintenance-related functions (e.g., system configuration, initialization, interrupt distribution).

While the present invention is described in the context of a multi-processor, shared memory system, the present invention is also applicable to single processor computer systems.

The embodiment of the computing system of FIG. 1 may include a plurality of processors and a plurality of caches. These processors and caches comprise a multiprocessor system in which the caches are kept coherent with one another through a cache coherence mechanism. The cache coherence protocol may be implemented in the processor caches and memory interconnects to keep the caches coherent.

Cache coherency must be addressed in multi-processor systems with shared memory. Cache coherence protocols address the issue of ensuring that no processors in the system are using stale data in the local caches. In general, stale cache entries can be eliminated by either invalidating in the caches all but the most recent updated cache data or updating the caches with the most recent data. In a system using the invalidation protocol, an attempt to access an invalidated memory location from cache will cause the processor to read a copy of the most recent data either from another cache or from main memory. In the update protocol, following a write operation all the caches having a cached version of the data are updated with the most recent data. Thus, the most recent data is available in the caches.

Figure 2:
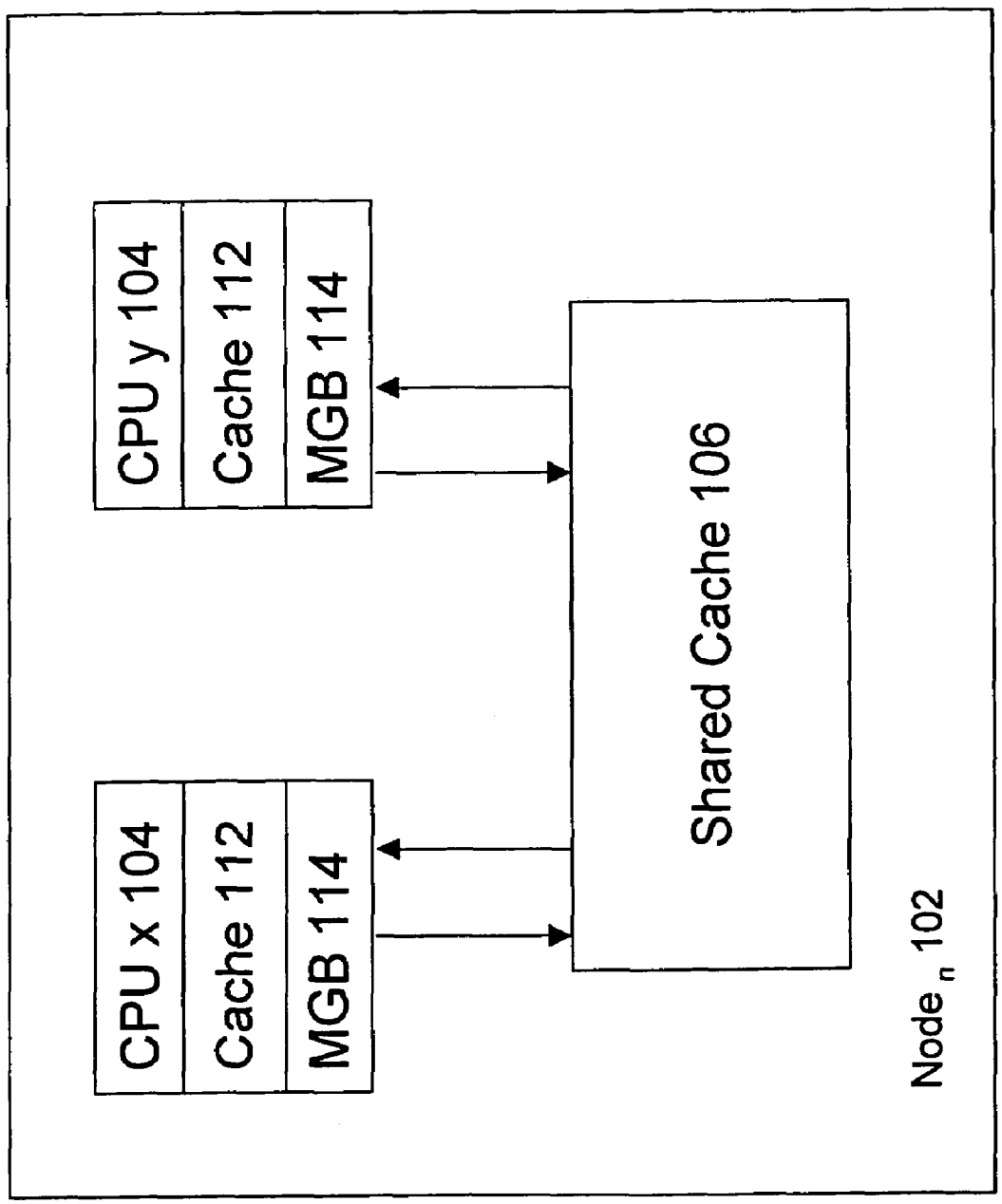
FIG. 2 is a block diagram of a processor in the multiprocessor system of FIG. 1.

FIG. 2 is a block diagram of a processor in the multiprocessor system of FIG. 1 predicting early write back of owned cache blocks. Each core 104 contains a private cache 112 which is a subset to the shared cache 106. These caches 112 may be write-through caches.

When a CPU has to do a write or a store to a memory address, the CPU needs to request ownership from the lower levels of the cache hierarchary of that block and not commit to write that block until its granted ownership. This has to occur to maintain correct cache coherency. When an ownership request is sent by CPU x, invalidate signals are driven to potential sharers, meaning other CPUs that have copies of this block. The coherence protocol will send an acknowledgment message, to CPU x that requested ownership, notifying them of their ownership of that block. After the acknowledgement message is sent, the write may now occur.

To minimize the store bandwidth that the write-through caches 112 would generate, each CPU 104 may have a coalescing merge buffer 114 to aggregate recent store data to the same cache block. The merge buffer 114 may contain 16 cache blocks total. Generally, the merge buffer 114 may attempt to keep owned blocks as long as possible to maximize the store data coalescing, and minimize write-through traffic back to the cache.

The write-back maybe caused by setting a "purgeMe" bit in the merge buffer 114 entry for which the original write request was sent. A purgeMe bit exists for every entry in the merge buffer 114. For each cycle, control logic associated with the merge buffer 114, attempts to select an entry with its purgeMe bit set, and write the block back to the shared memory agent 106. If no entries have their purgeMe bit set, then no entries are selected.

The purgeMe bit may be set for various reasons. One reason is because the merge buffer 114 fills up with valid entries and crosses a "purge threshold". If the merge buffer 114 crosses this purge threshold, the control logic associated with the merge buffer 114 may then set the purgeMe bit for one or more entries. By setting the purgeMe bit of the entries, they can now be written back to the shared cache 106 to make room for newly arriving committed stores. For system 100, the purgeMe bit may be set for an entry if it is predicted that the corresponding data is going to be utilized by another CPU or cache coherent agent. The purgeMe bit may also be set when another processor requests the corresponding data block in this processor's merge buffer.

Figure 3:
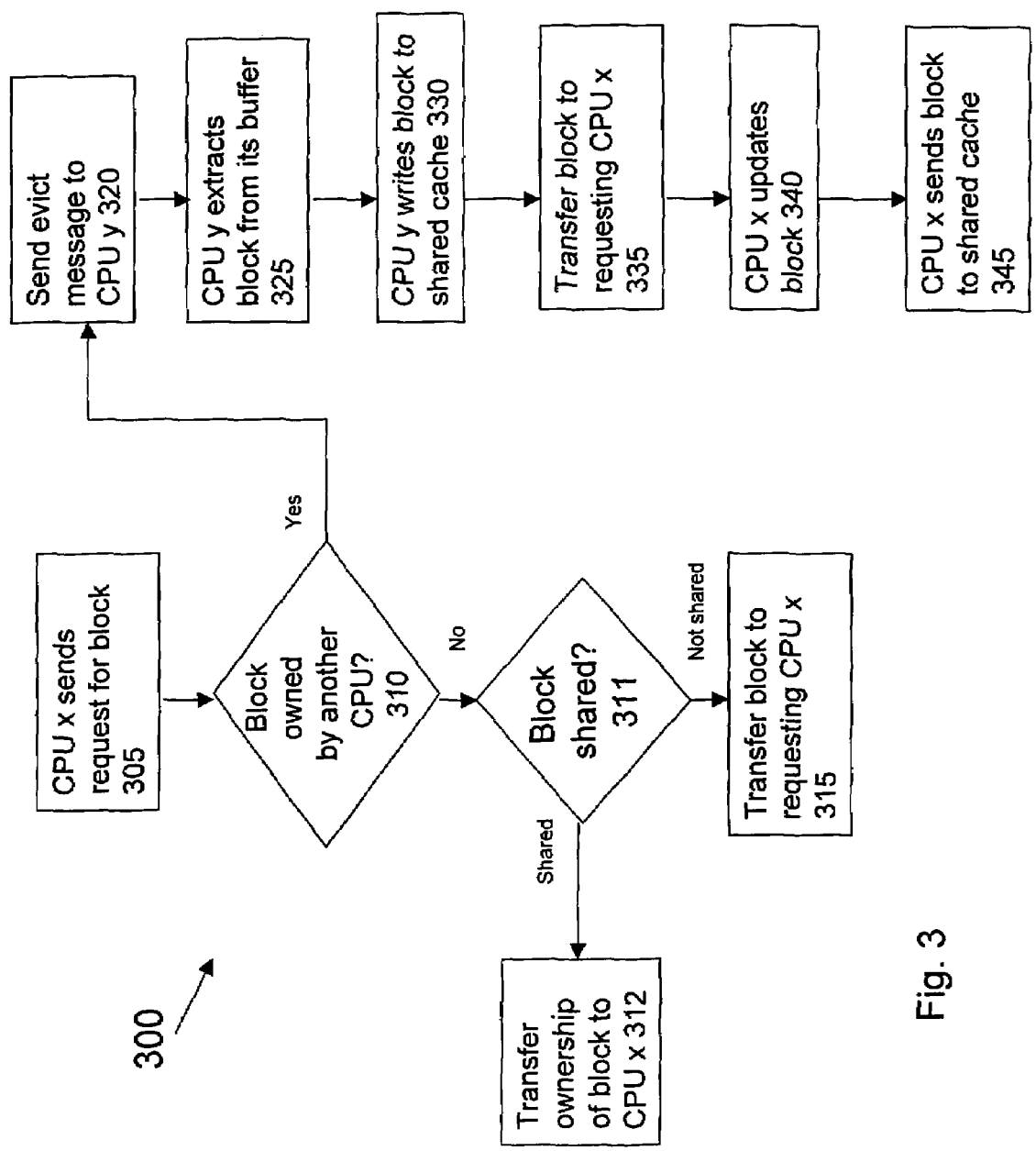
FIG. 3 is a flow chart of an example method performed by the multiprocessor system of FIG. 1 to predict early write back of owned cache blocks.

FIG. 3 is a flow chart of an example method 300 performed by the multiprocessor system of FIG. 1 to predict early write back of owned cache blocks. The prediction of blocks to write-back is based upon messages in the cache coherence protocol in response to the originating CPU's ownership request.

If an ownership request is sent from CPU x to the shared cache 305, the shared cache has to first determine if the requested block is owned by another CPU 310. If the requested block is not owned by another CPU, then the system determines if the requested block is shared 311 by another CPU or may other CPUs. If the block does not have any other sharers of the block, an AckNonShared message is sent to grant ownership of the block and declare that no other CPUs had a copy of the block 315. However, if the block is not owned but shared, an AckWasShared message is sent and ownership is transferred to CPU x 312.

If the block was owned by another CPU, such as CPU y, an evict message is sent to CPU y 320. If the evict message is received, CPU y sets the purgeMe bit, causing the extraction of the block from its merge buffer 325. Once the block is extracted from the merge buffer, CPU y writes the block back to memory, relinquishing ownership of it 330.

The updated block is now sent to the requesting CPU x 335. CPU x may now update the block with the current data 340 and then send the block immediately to the shared cache 345. The updated block is sent immediately to the shared cache because the block of data was previously owned by another CPU, CPU y.

Now assuming CPU x needs to write the block again, another ownership request will be sent to the shared cache 305. This time, if no other CPUs have read the block in the interim, meaning block is not owned 310 and is not shared 311, an AckNonShared message is sent to CPU x 315. CPU x may now hold the block until it is evicted for capacity reasons (or is requested by another CPU).

If, however another CPU has read the block in the interim, meaning block is not owned 310 but is shared 311, the AckWasShared message is sent in to CPU x 312, and again the block is written back early.

If CPU y now requests the block, it may already have been written back to the shared cache by last CPU to request the block, or if not, it may be in transit. If the block had already been written back to the shared cache, this would reduce a 4-hop transaction to a 2-hop transaction, potentially cutting the synchronization latency in half.

Therefore, if other CPUs had (or might have had) copies of the block when the requesting CPU makes an ownership request, it writes it back as soon as possible. If other CPUs had copies of the block, but are no longer accessing the block, the first write to it may cause an expedient write-back of the block, but subsequent writes may not.

Previously, a processor did not distinguish acknowledgement of a block that was shared and one that was not shared. With the method described above, a processor may now determine how quickly it should send a block back to the shared backing cache. This enables the system to predict when fast sharing is necessary.

Advantageously, this method enables the system to predict which written blocks may be more likely to be requested by another CPU and the owning CPU will write those blocks back to memory as soon as possible after updating the data in the block. If another processor is requesting the data, this can reduce the latency to get that data, reducing synchronization overhead, and increasing the throughput of parallel programs.

Figure 4:
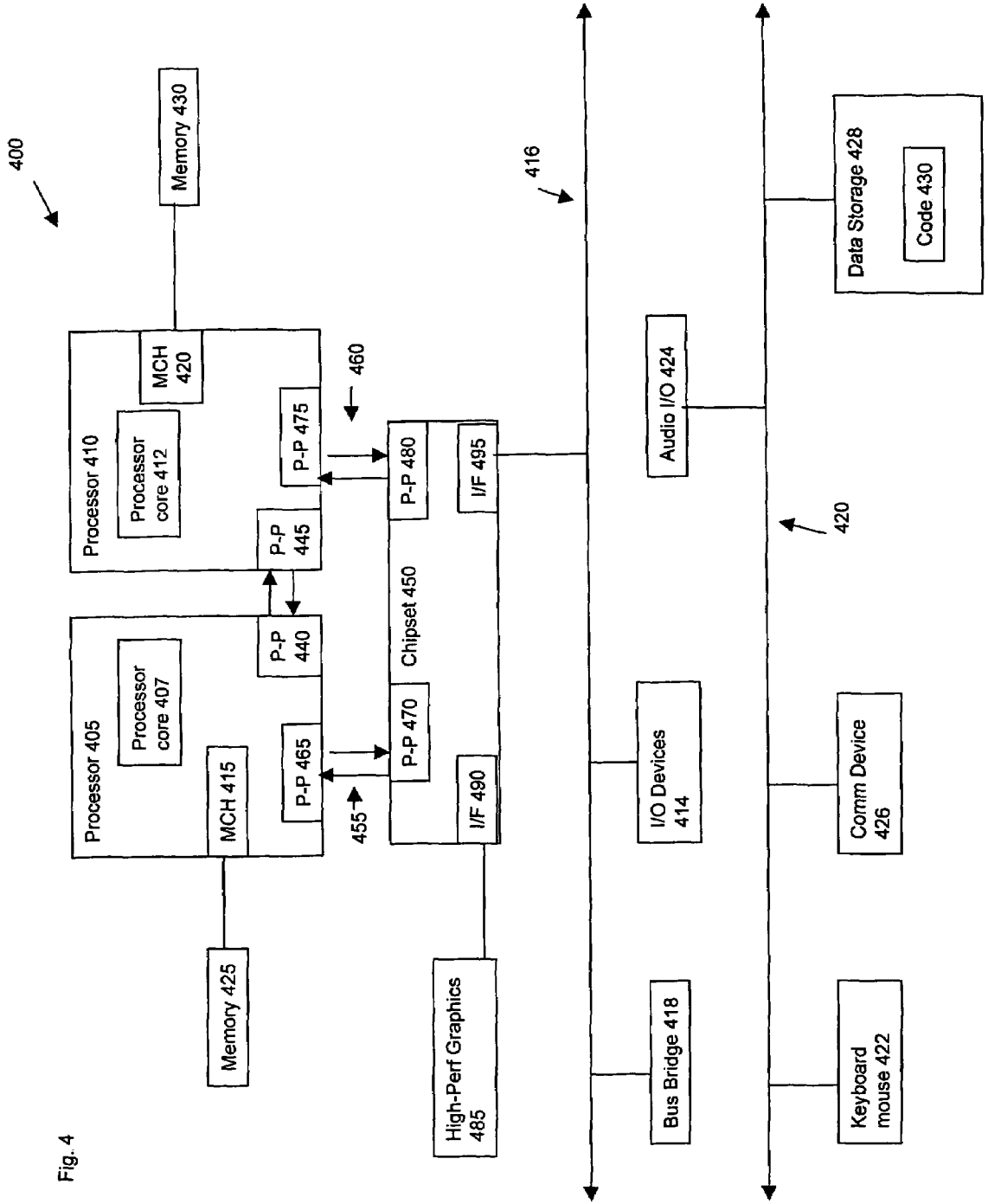
FIG. 4 is block diagram of a system that may provide an environment for multithreaded processors.

Referring now to FIG. 4, the system 400 includes processors supporting predictive early write-back of owned cache blocks. The system 400 generally shows a system where processors, memory, and input/output devices are interconnected by a number of point-to-point interfaces. The system 400 may also include several processors, of which only two, processors 405, 410 are shown for clarity. Each processor 405, 410 may each include a processor core 407, 412, respectively. Processors 405, 410 may each include a local memory controller hub (MCH) 415, 420 to connect with memory 425, 430. Processors 405, 410 may exchange data via a point-to-point interface 435 using point-to-point interface circuits 440, 445. Processors 405, 410 may each exchange data with a chipset 450 via individual point-to-point interfaces 455, 460 using point to point interface circuits 465, 470, 475, 480. Chipset 450 may also exchange data with a high-performance graphics circuit 485 via a high-performance graphics interface 490.

The chipset 450 may exchange data with a bus 416 via a bus interface 495. In either system, there may be various input/output I/O devices 414 on the bus 416, including in some embodiments low performance graphics controllers, video controllers, and networking controllers. Another bus bridge 418 may in some embodiments be used to permit data exchanges between bus 416 and bus 420. Bus 420 may in some embodiments be a small computer system interface (SCSI) bus, an integrated drive electronics (IDE) bus, or a universal serial bus (USB) bus. Additional I/O devices may be connected with bus 420. These may include keyboard and cursor control devices 422, including mouse, audio I/O 424, communications devices 426, including modems and network interfaces, and data storage devices 428. Software code 430 may be stored on data storage device 428. In some embodiments, data storage device 428 may be a fixed magnetic disk, a floppy disk drive, an optical disk drive, a magneto-optical disk drive, a magnetic tape, or non-volatile memory including flash memory.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method comprising:
   requesting a block with a first processor;
   determining if a second processor owns the requested block;
   transferring the requested block to the first processor;
   updating the requested block to an updated block after transferring the requested block to the first processor; and
   attempting to merge other data associated with the updated block in a merge buffer within the first processor in response to determining the second processor did not own the requested block before transferring the requested block to the first processor; and
   immediately writing the updated block to a memory shared by the first and the second processor without attempting to merge other data associated with the updated block after updating the requested block in response to the second processor owning the requested block before transferring the requested block to the first processor.

2. The method of claim 1 wherein the transferring the block to the first processor further comprises sending a first signal to the first processor.

3. The method of claim 1, further comprising determining if the requested block is shared by the second processor wherein determining if the requested block is shared by the second processor comprises receiving a shared signal from the second processor indicating the requested block is held in a shared cache coherency state by the second processor.

4. The method of claim 3 further comprising: attempting to merge other data associated with the updated block in the merge buffer in response to determining the second processor does not share the requested block.

5. The method of claim 4 further comprising immediately writing the updated block to a memory shared by the first and the second processor after updating the requested block in response to the second processor sharing the requested block before transferring the requested block to the first processor.

6. The method of claim 1 further comprising: sending an evict message to the second processor with the first processor in response to the second processor owning the requested block.

7. The method of claim 6 further comprising extracting the requested block from a buffer in the second processor in response to the second processor owning the requested block.

8. The method of claim 7 further comprising: writing the requested block to the memory shared by the first processor and the second processor in response to the second processor owning the requested block.

9. The method of claim 8 further comprising:
   requesting the updated block by the first processor;
   determining if the second processor has requested the updated block since the updated block was immediately written to the memory; and
   transferring the updated block to the first processor.

10. The method of claim 9 further comprising sending a first signal to the first processor if the second processor has not requested the updated block since the updated block was sent to memory by the first processor.

11. An apparatus comprising:
    a first processor core including a first buffer to merge writes to a shared cache;
    a second processor core including a second buffer to merge writes to the shared cache;
    the shared cache coupled to the first and the second processor cores;
    wherein the first processor core is to: request ownership of a block of data associated with the shared cache, obtain ownership of the block of data, and update the block of data to an updated block, and wherein the first processor core is further to: attempt to merge the updated block of data with another block of data in the first buffer to form a merged write in response to the second processor core not owning the block of data; and immediately write the updated block of data from the first buffer back to the shared cache without an attempt to merge the updated block of data with another block of data in response to determining the second processor core owning the block of data upon the first processor core requesting ownership of the block of data.

12. The apparatus of claim 11 wherein in response to the first processor core subsequently requesting ownership of the updated block of data during the attempt to merge the updated block of data with another block of data:
    determining if the second processor core shares the updated block of data; and
    immediately writing the updated block of data from the first buffer to the shared cache without merging the updated block of data with the another block of data responsive to determining the second processor core shares the updated block.

13. The apparatus of claim 12 wherein the second buffer includes a purge bit for every block of data within the buffer, and wherein the block of data is extracted from the second buffer by setting the purge bit in response to the second processor core owning the block of data before the first processor obtains ownership of the block of data.

14. The apparatus of claim 12 wherein the first and the second buffers are private caches capable of merging writes to the shared cache, and wherein the shared cache is to determine ownership of the block of data and the updated block of data.

15. The apparatus of claim 14 wherein the shared cache determines ownership of a block of data comprises the shared cache holding the block of data in a cache coherency protocol state which indicates ownership of the block of data.

16. A multiprocessor computer system comprising a plurality of nodes, each node from said plurality of nodes comprising:

at least first and second processors, wherein the first and second processor include:
- a shared cache coupled to the first and second processors, wherein the shared cache determines ownership of a block of data,
- a first buffer located within the first processor and a second buffer located in the second processor, wherein the first and the second buffer are capable of merging writes to the shared cache, and
- wherein the first processor is to request the block, to obtain the block and to update the block to an updated block, and wherein
  - in response to the second processor not owning and not sharing the block before the first processor is to obtain the block, the first processor is to attempt to merge the updated block in the first buffer before writing the updated block to the shared memory, and
  - in response to the second processor owning or sharing the block before the first processor is to obtain the block, the first processor is to immediately write the updated block to the shared cache without attempting to merge the block of data in the first buffer to form a merged write, and
- a first interface to communicate with input/output devices.

17. The multiprocessor system of claim 16 wherein the buffer in the first and second processors includes a bit for every block within the buffer.

18. The multiprocessor system of claim 17 wherein the block in the buffer is extracted when the bit is set.

19. The multiprocessor system of claim 16 wherein in response to the second processor owning the block the first processor is to obtain the block comprises: transferring the block to the first processor.

20. The multiprocessor system of claim 16 wherein in response to the first and the second processors sharing the block, the first processor is to obtain the block, to update the block to an updated block, and to immediately write the updated block to the shared cache without merging the block of data with another block of data in the buffer located within the first processor to form a merged write.

21. The multiprocessor system of claim 20 wherein in response to the first and the second processor sharing the block the first processor is to obtain the block comprises: the shared cache sending a shared signal to indicate the block is being held in a shared cache coherency state.

22. The multiprocessor system of claim 16 wherein the first interface is a point to point interface.

* * * * *

UNITED STATES PATENT AND TRADEMARK OFFICE
CERTIFICATE OF CORRECTION

PATENT NO. : 7,624,236 B2
APPLICATION NO. : 11/023882
DATED : November 24, 2009
INVENTOR(S) : Chrysos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 142 days.

Signed and Sealed this

Twenty-sixth Day of October, 2010

David J. Kappos
*Director of the United States Patent and Trademark Office*